United States Patent [19]

Galano

[11] Patent Number: 5,717,008
[45] Date of Patent: Feb. 10, 1998

[54] COMPOSITION FOR USE IN SCULPTURING, A SCULPTURING PIECE COMPRISING THE COMPOSITION AND METHOD FOR OBTAINING THE PIECE

[76] Inventor: Hector Luis Galano, Colon St. 241, Tigre City - Province of Buenos Aires, Argentina

[21] Appl. No.: 539,596

[22] Filed: Oct. 5, 1995

[30] Foreign Application Priority Data

Oct. 28, 1994 [AR] Argentina ................... 329.929

[51] Int. Cl.$^6$ ............... C08J 9/24; C08J 11/04; C08K 3/36; C08K 3/08

[52] U.S. Cl. ............ 523/205; 521/42; 521/49.8; 521/91; 521/92; 521/142; 521/146; 521/82; 524/13; 524/440; 524/442; 524/451; 524/528; 524/582; 524/585

[58] Field of Search ................. 523/205, 220, 523/139, 140, 141, 142, 143, 144, 145, 146, 147, 148; 524/13, 440, 442, 451, 493, 577, 492, 528, 582, 585; 521/91, 92, 142, 146, 82, 40, 49.8; 428/403, 404, 405, 407

[56] References Cited

U.S. PATENT DOCUMENTS

| | | | |
|---|---|---|---|
| 2,868,759 | 1/1959 | Bechu | 521/92 |
| 4,085,246 | 4/1978 | Buser et al. | 523/220 |
| 4,199,484 | 4/1980 | Murphey | 428/407 |
| 4,248,974 | 2/1981 | Fujii et al. | 521/91 |
| 4,863,519 | 9/1989 | Holm | 428/407 |
| 4,891,266 | 1/1990 | Keith | 523/205 |
| 5,155,146 | 10/1992 | Reetz | 524/13 |
| 5,171,614 | 12/1992 | Keith | 428/15 |
| 5,298,553 | 3/1994 | Kita | 524/432 |
| 5,422,371 | 6/1995 | Inoue | 523/220 |
| 5,439,964 | 8/1995 | Ohst et al. | 524/442 |
| 5,461,114 | 10/1995 | Kita | 524/493 |

*Primary Examiner*—Peter A. Szekely
*Attorney, Agent, or Firm*—Rodman & Rodman

[57] ABSTRACT

A composition for use in sculpturing, a sculpturing piece comprising the composition and a method for obtaining the piece, wherein the composition comprises 90 to 99% of a particulate material consisting of particles having a size from 0.05 to 2 mm, and a plastic binder from 1 to 10% by weight based on the total weight of the composition, each particle of the particulate material being encapsulated by a film layer of the plastic binder.

16 Claims, No Drawings

COMPOSITION FOR USE IN SCULPTURING, A SCULPTURING PIECE COMPRISING THE COMPOSITION AND METHOD FOR OBTAINING THE PIECE

BACKGROUND OF THE INVENTION

1. Field of the Invention

The present invention relates to sculpturing products capable of being easily worked by non expert persons, the products comprising a composition which mostly consists of a particulate material while a minimum part thereof comprises a plastic binder. A sculpturing piece or block is also provided comprising the above mentioned composition wherein the quantity of the binder is the minimum amount sufficient to keep the particles of the particulated material adhered to each other without forming an excessively compact solid block. The invention also relates to a method for manufacturing the sculpturing piece.

2. Description of the Prior Art

Materials for modeling and sculpturing are well known in the art and widely used by artists, professional sculptors and non-professional hobbyists such as students or children. Most of these materials comprise mixtures of clays; oil-based clay mixtures; a mixture of wood powder, hydrocarbon oil and rubber reinforced styrene resin; a mixture of crushed paper and a binding material and, generally, mixtures of fine powders and a plastic or binding material.

One example of the above mentioned prior art is the U.S. Pat. No. 5,287,237 issued to Masami Kita on Aug. 7, 1992 and assigned to Daicel, Huls Ltd., Tokyo, Japan, which patent discloses a sculpturing resin composition comprising a polyoctenamer resin and a polyolefin copolymer and/or a polyolefin resin. This patent is based on the finding that mixing the polyoctenamer resin with a polyolefin copolymer and/or a modified polyolefin resin prevents shrinking of the polyoctenamer resin, whereby the sculpturing resin has non shrinking properties and may be molded by hand at moderate temperatures, sculptured or shaved with a chisel, and polished or ground with a rasp. In order to provide the composition of U.S. Pat. No. 5,287,237 with a higher density, a more beautiful surface smoothness and massiveness affect in the case of handling thereof, an inorganic filler may be added to the resin composition. Inorganic fillers disclosed in the patent include conventional fillers for plastics, such as zinc oxide, calcium carbonate, titanium dioxide, silica, a powdered glass and a powdered metal.

Those fine powders like zinc oxide are preferred in U.S. Pat. No. 5,287,237 because of the excellent surface smoothness for sculptured products. It is also disclosed in U.S. Pat. No. 5,287,237 that the content of the fillers is generally from 20 to 90% by weight and preferably from 50 to 75% by weight based on the total weight of the composition, because where the content is more than 90%, the composition is too brittle to be sculptured, resulting in difficulty in shaving or polishing.

Another U.S. Pat. No. 5,298,553 issued to Masami Kita on Mar. 29, 1994 and assigned to Daicel, Huls Ltd., Tokyo, Japan, discloses a composition for use in sculpturing, consisting essentially of a polyoctenamer resin and an inorganic filler. It is disclosed in the patent that the polyoctenamer resin alone has a low density and this results in cheapish-feeling sculptured products. This is however improved by an addition of an inorganic filler of high density. In U.S. Pat. No. 5,278,237, zinc oxide is more preferably used because of the excellent surface smoothness in sculptured products.

The above prior art emphasize obtaining a resin mixture to produce a cohesive, compact plastic solid, with higher massiveness, higher density, higher hardness, non-shrinking properties and excellent surface smoothness. These properties may be desired by professional artists and sculptors since harder, careful and high quality professional work is involved by using several chisels and hammers. Since hammering is necessary, much care must be taken to avoid breaking the work, piece or sculptured product.

It is well known that a resin-made block or any other piece consisting of a hardened resin or resin mixture will generate dust when shaved, chiseled or polished. This is dramatically increased when fine powders, such as clays, zinc oxide and the like, are contained in the resin mixture. The cloud of dust generated during chiseling results in dangerous pollution, particularly because this dust is inhaled by the chiseler. It is readily apparent that a composition like the ones of the prior art cannot be recommended to teach students or to be used as toys by children. As stated above, skillfulness and expertness are required to chisel and sculpt a block or piece prepared according to a resin mixture of the above cited prior art. In addition, since thermosetting plastics, such as resins, are involved, the sculptured product would be wasted, without recycling, in the event that the piece has broken during chiseling or the workpiece obtained is not as beautiful as expected. This also results in pollution.

3. Summary of the Invention

It is an object of the present invention to solve the drawbacks and problems of conventional modeling and sculpturing compositions and pieces and to provide a sculpturing composition capable of being not only molded at moderate temperatures but also easily sculptured by means of any shaving, chiseling and/or scraping tool without skillfulness being required and without unhealthy polluting dust being produced which, otherwise, may be inhaled by the user. The composition of the invention comprises inexpensive constituents, particulate materials that may be easily obtained, such as any kind of sand, and binder materials with lower melting points.

It is another object of the invention to provide a sculpturing composition the major part thereof, such as 90 to 99%, comprising a particulate material consisting of particles having a size from 0.05 to 2 mm, and at least part thereof, such as 1 to 10%, comprising a plastic binder, such as a thermoplastic or a thermosetting material, wherein each particle of the particulate material has its outer surface entirely encapsulated by the plastic binder.

Still another object of the invention is to provide a piece or block capable of being sculptured, comprising the above mentioned composition, wherein the particles are adhered to each other by the binder with enough adherence to keep the particles from forming a solid and in enough amounts to allow those particles located at the outer surface of the piece to be removed by shaving or chiseling.

It is a further object of the invention to provide a method for manufacturing a sculpturing piece or block, comprising the steps of:

providing 90% by weight of the particulate material, based on the total weight of the piece;

heating the particulate material to 120° C. within a rotary furnace while rotating the furnace;

adding 10% by weight of a thermoplastic binder, based on the total weight of the piece, while rotating the furnace;

continuing rotating the furnace during a predetermined time, and pouring the composition within a mold and cooling down the temperature of the composition to room temperature, to form a molded piece capable of being easily sculptured by means of a shaving or chiseling tool.

It is still a further object of the invention to provide a method for manufacturing a sculpturing piece or block, comprising the steps of:

providing 90% by weight of the particulate material, based on the total weight of the piece;

preparing a thermosetting-based binder fluidic solution, containing 4% of solids by weight based on the total weight of the piece;

adding the thermosetting-based binder solution while rotating the furnace;

continuing rotating the furnace during a predetermined time, and pouring the composition within a mold and allowing the composition to solidify in a ventilated environment to room temperature, to form a molded piece capable of being easily sculptured by means of a shaving or chiseling tool.

The above and other objects, features and advantages of this invention will be better understood when taken in connection with the following description.

DESCRIPTION OF THE PREFERRED EMBODIMENTS

The composition of the invention comprises mainly two materials, a particulate material and a plastic binder material. The concept of the invention is that the major part of the composition comprises the particulate material while a minor part of the composition is the binder material. With this composition sculpturing pieces or blocks may be molded wherein the particles are encapsulated by a minimum quantity of binder sufficient to obtain the desired adherence of the particles. The blocks have a natural stone appearance and characteristics, and sculpturing is easily carried out by removing, such as by scraping or shaving, superficial particles of the block rather than by cutting, chiseling and/or hammering the block.

By varying the size of the granules or particles, even by mixing different sizes of particles in the same composition, the adhesiveness and hence the hardness of the piece may be adjusted to obtain pieces or blocks from each other in a wide variety of hardness. Then, each hardness will be recommended for several applications such as higher hardnesses for professional sculpturing and lower hardnesses for teaching and toys. The variation of the piece or block resistance to carving, chiseling or shaving is achieved by the encapsulation of the particles by a layer of the plastic binder. Therefore, the adhesiveness and hence the resistance will depend upon the thickness of the encapsulating binder layer, the resistance and flexibility features of the binder, the specific surface of the particles, size distribution of the particles and the method of applying and distributing the binder onto the surface of the particles.

Since the particles have irregular shapes, voids are formed between the particles and within a mass formed by the composition, and the plastic binder that covers the outer surface of each particle forms a film-like layer around each particle, whereby at least part of the voids remain unoccupied by the plastic binder and adherence is only maintained in the points wherein the surface of a particle is contacting the surface of an adjacent particle.

Therefore, with the same plastic binder it is possible to obtain different degrees of cohesion by varying only the specific surface and distribution of the particles. Thus any plastic binder may be used while the features of the composition may be obtained.

The particulate material may comprise a variety of materials consisting of particles like any kind of sand, stone particles, granite stone powder, quartz powder blast furnace ashes, vermiculite, iron granules or pellets, other metal pellets, wood sawdust, etc. Preferably the particles have sizes from 0.05 to 2 mm, and more preferably from 0.1 to 2 mm. The particulate material may be present between 90 to 99% by weight based on the total weight of the composition.

The plastic binder may be any binder used alone or mixed that is capable of forming a proper adhesive layer onto the surface of the particles, capable of melting at lower temperatures without generating toxic vapor or gases, capable of being dissolved in a solvent or chemical agent, capable of resisting chemical and atmospheric agents, and capable of showing compatibility to pigments. Plastic binders according to the invention may comprise thermoplastics or thermosetting materials, and any other plastic material capable of being at an initial fluidic state to recover the particles and capable of solidifying to obtain the necessary cohesion for obtaining sculpturing pieces or blocks. The plastic binder preferably has a melting point from 50° to 200° C. The binder will be preferably present from 0.5 to 10% by weight based on the total weight of the composition.

Plastic binders for the invention may be polyethylene wax, such as wax "A" marketed by the firm BASF, wax "PE 520" marketed by the firm HOECHST, polystyrene, colophony resin, maleic resin, shellac, acrylic resins, fumaric resin, vinylic resins, polyesters, polyethylene, polypropylene and other plastics including those recycled from waste containers, toys, etc., such as recycled polystyrene.

Several pigments may be added to the composition either to improve its appearance or to identify several hardness degrees of the compositions. These pigments must be resistant to atmospheric agents, must be non-toxic, capable of easy spreading all over the composition and capable of resisting the melting temperature of the composition without decaying. Pigments such as ferrite, Prussia blue, phthalocyanine blue, etc. may be present in 0.1 or 0.2%, depending on the desired color intensity.

According to the composition of the invention pieces like cubes or blocks having any desired shape may be obtained by heating and mixing the particulate material with the plastic binder and molding the mass obtained in molds. The blocks are capable of being easily sculptured and are formed in a way that the particles of the composition are adhered to each other by the binder with enough adherence to keep the particles from forming a solid and in enough amounts to allow the particles to be removed, by shaving or chiseling, from an outer surface of the piece The blocks of the invention are obtained, also in accordance with the invention, by a method comprising the steps of:

providing from 90 to 99% by weight of the particulate material, based on the total weight of the piece;

heating the particulate material to a temperature about 120° to 400° C. within a rotary furnace while rotating the furnace;

adding 1 to 10% by weight of a thermoplastic binder, based on the total weight of the piece, while rotating the furnace;

continuing rotating the furnace during a predetermined time, and pouring the composition within a mold and cooling the temperature of the composition to room temperature, to form a molded piece capable of being easily sculptured by means of a shaving or chiseling tool.

Alternatively, when a binder based on a thermosetting material is used, one method comprises the steps of:

providing 90% by weight of the particulate material, based on the total weight of the piece;

preparing a thermosetting-based binder fluidic solution, containing 4% of solids by weight based on the total weight of the piece;

adding the thermosetting-based binder solution while rotating the furnace;

continuing rotating the furnace during a predetermined time, and pouring the composition within a mold and allowing the composition to solidify in a ventilated environment to room temperature, to form a molded piece capable of being easily sculptured by means of a shaving or chiseling tool.

It is important to note that although a thermoplastic or a thermosetting material is referred to in this application, any natural or synthetic plastic material can always be used when in a fluidic state at the time of mixing it with the particulate material and is capable of being cured or hardened by any means like temperature, cooling, chemical agents, solvent, etc.

The following examples are given to illustrate the practice of this invention but they are not intended in any way to act to limit the scope of this invention.

EXAMPLE 1

A particulate material consisting of 959 parts per weight of sand taken from a river were dried and put through a sieve whereby the sand was selected so as to consist of grains having a size smaller than mesh No. 40 ASTM and grains larger than mesh No. 100 ASTM. The sand was heated to 120° C. within a closed rotary furnace.

A plastic binder consisting of 40 parts per weight of polyethylene wax (wax A manufactured by BASF) having a softening point from 98° to 108° C., a hardness Hoppler from 150 to 300 bar at 23° C. and a melting viscosity from 950 to 1550 mm2/sec at 120° C., was added to the heated sand in the furnace.

While rotation was continuously carried out with the mass formed by the sand and wax, 1 part per weight of ferrite (pigment) was added to the mass. The furnace was then continuously rotated for 35 minutes while keeping the above cited temperature. Then the mass was removed from the furnace and poured into cardboard-made cubic molds having a volume of 1000 cc.

The formed cubes were cooled down to room temperature and red blocks or pieces were obtained once taken out of the mold. The pieces were sculptured with a chisel and no dust were generated but only the most superficial sand grains were scraped off or removed by each shaving.

EXAMPLE 2

A particulate material consisting of 939 parts per weight of granite stone powder was dried and put through a sieve whereby the powder was selected to consist of grains or particles having a size smaller than mesh No. 40 ASTM and grains larger than mesh No. 100 ASTM. The particles were heated to 130° C. within a rotary furnace.

A plastic binder consisting of 60 parts per weight of polyethylene wax (wax PE 520 manufactured by the firm HOECHST) having a drop point from 118° to 123° C. and a solidification point of about 108° C., was added to the heated granite stone powder in the furnace.

While rotation was continuously carried out with the mass formed by the powder and wax, 1 part per weight of Prussian blue (pigment) was added to the mass. The furnace was then continuously rotated for 40 minutes while keeping the above cited temperature. Then the mass was removed from the furnace and poured into cardboard-made cubic molds having a volume of 1000 cc.

The formed cubes were cooled down to room temperature and clear-green blocks or pieces with a hardness higher than in Example 1 were obtained from the mold. The pieces were easily sculptured with a shaving tool and no breathable dust was generated and only the most superficial particles were scraped off or removed by each shaving.

EXAMPLE 3

A particulate material consisting of 938 parts per weight of granulated iron was dried and put through a sieve whereby the granulate was selected to consist of grains or particles having a size smaller than mesh No. 120 ASTM and grains larger than mesh No. 200 ASTM. The particles were heated to 130° C. within a rotary furnace.

A plastic binder consisting of 20 parts per weight of polyethylene wax (wax PE 520 manufactured by the firm HOECHST) having a drop point from 118° to 123° C. and a solidification point of about 108° C., 20 parts per weight of stearic acid and 20 parts per weight of paraffin having a ring-and-ball type softening point of 80° C. and 65° C., respectively, was added to the heated granulated iron in the furnace. After rotating the furnace for 15 minutes, 2 parts per weight of phthalocyanine blue (pigment) was added.

The furnace was then continuously rotated for 40 minutes while decreasing the temperature to 120° C. Then the mass was removed from the furnace and poured into cardboard-made cylindrical molds having a volume of 2000 cc.

The formed cylindrical blocks were cooled down to room temperature and blue blocks or pieces with a high specific weight were obtained from the mold. The pieces were easily sculptured with a shaving tool and no breathable dust were generated and only the most superficial particles or grains were scraped off or removed by each shaving.

EXAMPLE 4

A particulate material consisting of 959 parts per weight of sand taken from a river was dried and put through a sieve whereby the sand was selected to consist of grains having a size smaller than mesh No. 40 ASTM and grains larger than mesh No. 100 ASTM.

A plastic binder consisting of 160 parts per weight of a polystyrene solution having a content of 25% solids, obtained from plastic containers, toys and expanded polystyrene in a solution with ethyl acetate was added to the sand in the furnace.

After 15 minutes of rotation, 1 part per weight of ferrite (pigment) was added. The closed furnace was then continuously rotated during 35 minutes. Then the mass was removed from the furnace and poured into cardboard-made cubic molds having a volume of 1000 cc.

The formed cubes were cured in a ventilated environment to room temperature and red blocks or pieces having a high hardness, like the ones of Example 1, were obtained once taken out of the mold. The pieces were sculptured with a chisel and no dust were generated and only the most superficial sand grains were scraped off or removed by each shaving.

EXAMPLE 5

A particulate material consisting of 59 parts per weight of sand taken from a river was dried and put through a sieve whereby the sand was selected to consist of grains having a size smaller than mesh No. 40 ASTM and grains larger than mesh No. 100 ASTM. The sand was fed to a closed rotary furnace.

A plastic binder consisting of 40 parts per weight of recycled portions mixed from about 50% of polyethylene and 50% of polypropylene from containers, toys and other used elements, were added to the sand in the furnace. The formed mass was gradually and slowly heated to 380° C. within the furnace in an inert environment based on nitrogen ($N_2$). The temperature was maintained for 2 minutes. Rotation of the furnace was carried out until the temperature decreased to 150° C.

While rotation was continuously carried out, 1 part per weight of ferrite (pigment) and 900 parts per weight of the same type of sand already added were added to the mass. The furnace was then continuously rotated for 35 minutes while keeping the above cited temperature. Then the mass was removed from the furnace and poured into cardboard-made cubic molds having a volume of 1000 cc.

The formed cubes were cooled down to room temperature and red blocks or pieces were obtained once taken out of the mold. The pieces were sculptured with a chisel and no breathable dust was generated and only the most superficial sand grains were scraped off or removed by each shaving.

It may be noted from the above examples that the blocks or sculpturing pieces according to the invention are rather similar to a natural stone than to a solid resin block with smooth outer surfaces. Not only is the appearance of the present blocks different when compared to blocks of the prior art but also their behavior upon sculpturing. While the conventional blocks require strong and careful hammering by means of special chisels and other professional tools and they can only be worked by professional artists or sculptors, the blocks of the present invention may be easily worked by young students and children, as a toy, without heavy tools or large forces being necessary for sculpturing.

In addition, since 90 to 99% of the block consists of a particulate material like sand, no dust is generated when chiseled or shaved by a sculpturing tool with the user not breathing polluting and dangerous dust as in the case of conventional sculpturing blocks using high percentages of resins that generate dust when chiseled and, in some cases, fillers consisting of fine powders like zinc oxide.

While preferred embodiments of the present invention have been described, it will be obvious to those skilled in the art that various changes and modifications may be made therein without departing from the scope of the invention as defined in the appended claims.

I claim:

1. A composition in the form of a piece or block having a natural stone appearance, comprising 90 to 99% of a particulate material consisting of particles having the size from 0.05 to 2.0 mm, and from 1 to 10% by weight based on the total weight of the composition of a plastic binder selected from the group consisting of polyethylene, polypropylene and mixtures thereof, each particle of the particulate materials having an outer surface entirely covered by the plastic binder, the plastic binder entirely covering the outer surface of each particle and forming a film layer around each particle so as to encapsulate each particle, a plurality of voids being formed between the encapsulated particles, the voids remaining unoccupied by the plastic binder, wherein said composition is substantially dust-free when shaped by a sculpting tool.

2. A composition in the form of a piece or block having a natural stone appearance comprising 90 to 99% of a particulate material consisting of particles having the size from 0.05 to 2.0 mm, and a plastic binder from 1 to 10% by weight based on the total weight of the composition, each particle of the particulate materials having an outer surface entirely covered by the plastic binder, the plastic binder entirely covering the outer surface of each particle and forming a film layer around each particle so as to encapsulate each particle, a plurality of voids being formed between the encapsulated particles, the voids remaining unoccupied by the plastic binder, wherein said plastic binder is a recycled material and said composition is substantially dust-free when shaped by a sculpting tool.

3. A composition in the form of a piece or block having a natural stone appearance comprising 90 to 99% of a particulate material consisting of particles having the size from 0.05 to 2.0 mm, and a plastic binder from 1 to 10% by weight based on the total weight of the composition, each particle of the particulate materials having an outer surface entirely covered by the plastic binder, the plastic binder entirely covering the outer surface of each particle and forming a film layer around each particle so as to encapsulate each particle, a plurality of voids being formed between the encapsulated particles, the voids remaining unoccupied by the plastic binder, wherein said particulate material is iron pellets and said composition is substantially dust-free when shaped by a sculpting tool.

4. A composition according to claim 2, wherein the plastic binder has a melting point from 50° C. to 200° C.

5. A composition according to claim 2, wherein several sizes of the particles are selected to form part of the same composition so that the size of the voids may be adjusted to obtain a desired adhesiveness between the particles.

6. A composition according to claim 2, wherein the plastic binder comprises a material selected from the group consisting of polyethylene and polypropylene.

7. A composition according to claim 3, wherein the binder is a recycled material.

8. A composition according to claim 2, wherein the plastic binder is selected from the group consisting of polystyrene, colophony resin, shellac, maleic resin, acrylic resins, vinylic resins, fumaric resin and polyesters.

9. A composition according to claim 2, wherein the binder comprises recycled polystyrene.

10. A composition according to claim 2, wherein the plastic binder is a thermoplastic material.

11. A composition according to claim 2, wherein the plastic binder is a thermosetting material.

12. A composition according to claim 1, including a pigment.

13. A composition according to claim 1, wherein the particulate material is sand.

14. A composition according to claim 2, wherein the particulate material is iron pellets.

15. A composition according to claim 2, wherein the particulate material is quartz particles.

16. A composition according to claim 2, wherein the particles are adhered to each other by the binder with sufficient adherence to keep the particles from forming a voidless solid and capable of allowing the particles to be removed by shaving or chiseling from an outer surface of the piece.

* * * * *